Patented Nov. 26, 1935

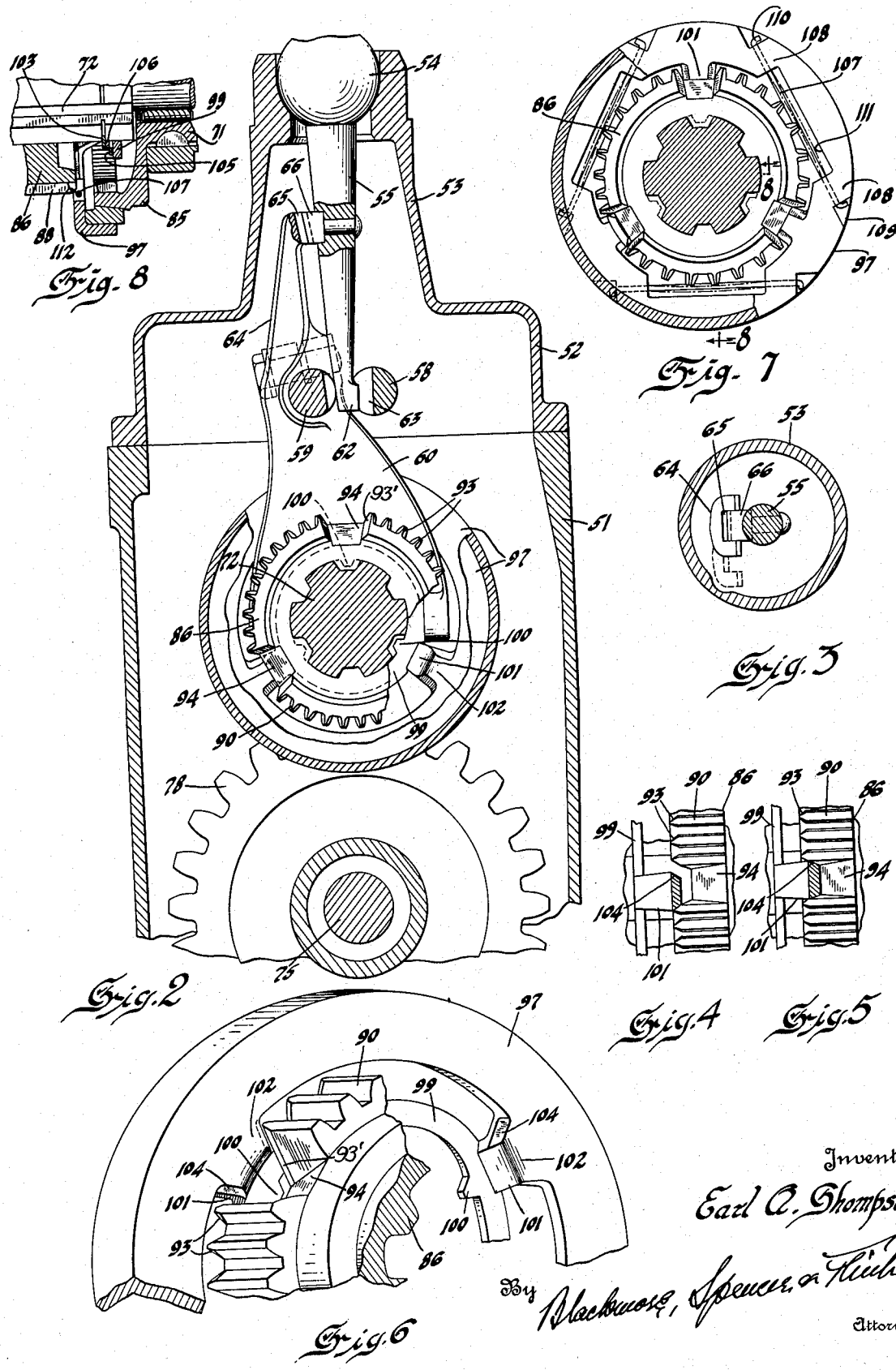

2,022,095

UNITED STATES PATENT OFFICE 2,022,095

SYNCHRONIZING DEVICE

Earl A. Thompson, Birmingham, Mich., assignor to General Motors Corporation, Detroit, Mich., a corporation of Delaware Application June 20, 1930, Serial No. 462,510

12 Claims. (Cl. 192—53)

The invention disclosed herein relates to transmission mechanisms comprising two coaxial power transmitting members respectively provided with toothed driving elements adapted to be intermeshed whereby one member may be positively driven from the other, and also provided, respectively, with frictionally engageable elements adapted to be coupled in order to bring the power transmitting members to equal speeds prior to intermeshing the positive driving elements. The invention is an improvement over that disclosed in my application Serial No. 302,228 filed August 27, 1928, and is particularly designed for motor vehicle transmissions although adapted for use with any variable speed gearing.

The chief object of the invention is to oppose movement of the toothed elements into contact while the power transmitting members to be coupled are rotating asynchronously and simultaneously to promote synchronization by causing a detent on one of a pair of friction elements to be interposed in the path of movement of one of the toothed elements toward the other in response to force applied by the differential rotation of said power transmitting elements, said friction and toothed elements being easily angularly displaceable by axially directed pressure against the detent when said force due to differential rotation disappears; i. e. when the rotation of said two power transmitting members becomes synchronous.

In the accompanying drawings wherein like reference characters indicate like parts throughout the several views:

Fig. 2 is a cross section on line 2—2 of Fig. 1;

Fig. 3 is a cross section on line 3—3 of Fig. 1;

Fig. 4 is a fragment illustrating schematically the position of a friction clutch element with respect to the movable element of the positive clutch when the power transmitting members are in asynchronous rotation;

Fig. 5 is a fragment illustrating schematically the same parts in position to permit intermeshing of the positive clutch elements when the transmission members are in synchronous rotation.

Fig. 6 is a fragmentary perspective view of a friction and positive clutch element when rotation of the power transmission members is asynchronous.

Fig. 7 is a view partly in transverse section illustrating a modification;

Fig. 8 is a fragmentary longitudinal section of the modified structure on line 8—8 of Fig. 7.

Figures 1, 9:
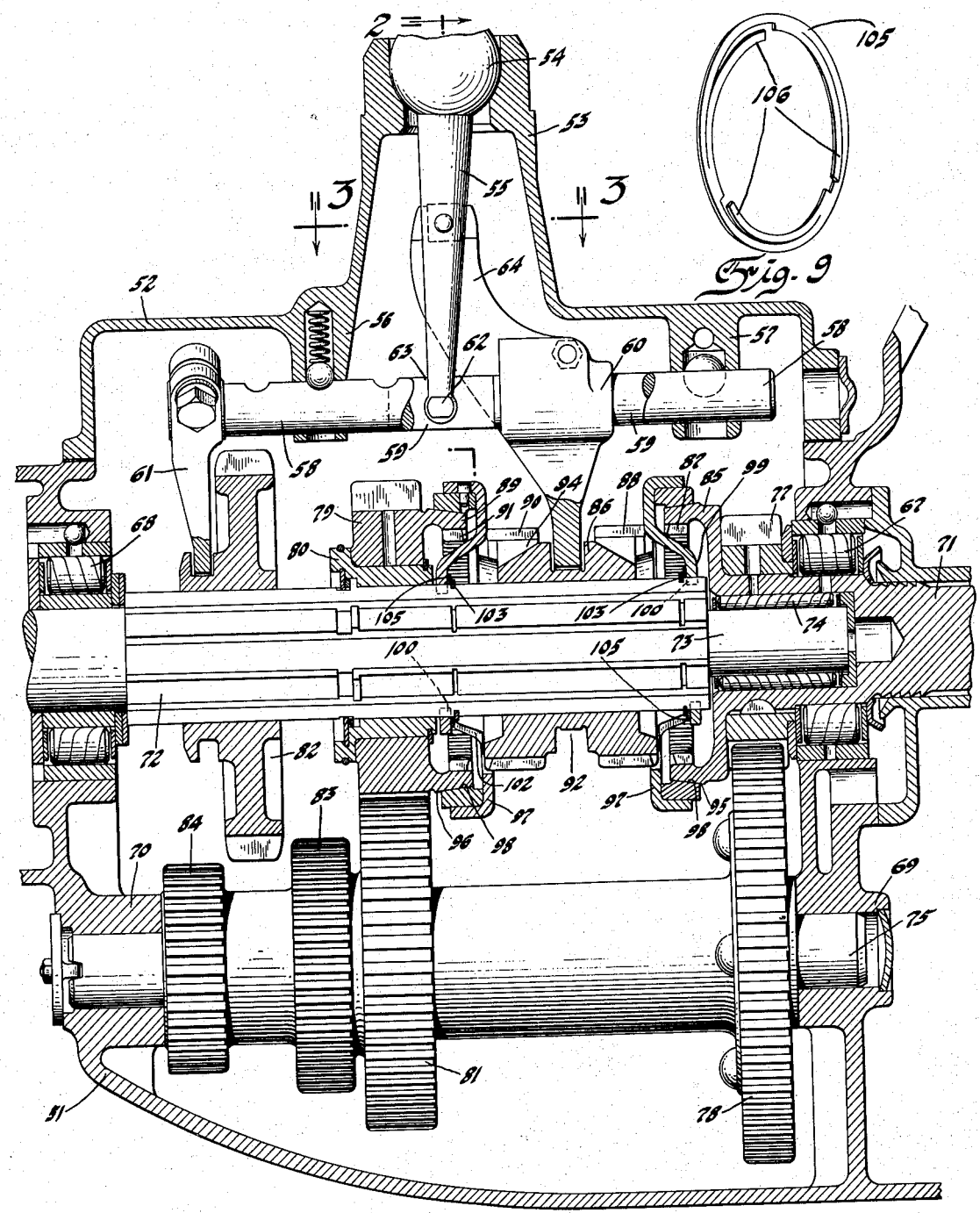
Fig. 1 is a section thru a motor vehicle gear box or casing and inclosed gear transmission showing the main clutch shaft and spline shaft gears in section.
Fig. 9 is a perspective view of an annular spring adapted to press the cooperating friction clutch elements lightly together.

In said drawings 51 indicates the body of the gear box, 52, the cover thereof, and 53 a hollow conical riser from the cover having on its upper end, as usual, a bearing for the ball joint 54 of a hand lever 55 for shifting gears in order to change the ratio of the transmission between engine and driving axle. Numerals 56 and 57 represent slide bearing hangers each perforated to receive the parallel slidable shift rods 58 and 59; rod 58, which is in front viewed as in Fig. 1, having been broken away to disclose the rod 59 behind it. Either of the shift rods may be engaged by hand shift lever 55 and caused to move longitudinally in either direction in the usual manner as predetermined by the operator to execute his intention to change the speed ratio by mechanism to be described. The variable speed mechanism illustrated has a capacity of three speeds forward and one reverse. The shift rod 59 carries a yoke 60 by which the gearing may be adjusted to direct drive or intermediate speed ratio, while the rod 58 carries a yoke 61 adapted to adjust the gearing to low or reverse.

The shift rods and hand lever described are quite conventional except for the form of the yoke 60 and its connection with the hand lever. The lower end 62 of lever 55 is adapted to engage a notch 63 in shift rod 58; but said lower end 62 is not coupled similarly to rod 59 when said rod 59 is selected to be shifted because, for reasons that will later appear, the parts moved by the latter rod have a shorter range of movement and require a greater force to be applied. Accordingly yoke 60 is provided with a rigid arm 64 having in its upper end a notch 65 open toward the lever 55, while the latter is provided with a lug 66 adapted to be interlocked with said notch when the parts are in neutral position. As the connection between hand lever 55 and yoke 60 is nearer to the fulcrum of the hand lever than the connection between said lever and shift rod 58 a greater mechanical advantage is utilized in shifting into high and intermediate than in shifting into low and reverse.

Gear casing 51 is provided with alined bearings 67 and 68 and with alined seats 69 and 70. Bearing 67 carries the power delivery end of the main power transmitting member which, as shown, is the main clutch shaft 71 of a motor vehicle. Bearing 68 supports a main driven member which, as shown, is the so-called spline shaft 72 of a motor vehicle transmission, which connects with the propeller shaft by a universal driving joint not shown. The front end 73 of the spline shaft is reduced and supported in a pilot bearing 74 formed as usual in a bore within the rear or power delivery end of the main clutch shaft. A fixed shaft 75 has its opposite ends supported in the seats 69 and 70. Sleeved on shaft 75 is a hollow countershaft rigidly connected to four gears as shown.

Drive gear 77 rigid with the power delivery end of shaft 71 is in constant mesh with gear 78 on the counter shaft. Gear 79 (one of the intermediate speed gears) mounted so that it may rotate freely on a bushing 80 that is keyed to the spline shaft and locked against longitudinal movement thereon, is in constant mesh with gear 81 on the counter shaft. Gear 82 is slidable upon the spline shaft and controlled in its sliding movements by said yoke 61. When moved forward gear 82 may be meshed with counter shaft gear 83 to adjust for low speed forward; when moved rearward it may be meshed with the reverse idler (not shown) which latter is in constant mesh with countershaft gear 84 as is customary.

In order to adjust the transmission train to direct drive or high speed ratio, spline shaft 72 must be positively coupled with main clutch shaft 71 while the remaining gears within the gear box must be adjusted to an idle relation ineffective to transmit power. The means for coupling in direct drive comprise a positive dog or toothed clutch element 85 rigid with shaft 71 and a positive cooperating dog or toothed clutch element 86 driven by or non-rotatable with respect to but slidable on the spline shaft 72. Clutch member 85 is dished or concaved and equipped with internal gear-like teeth 87, while clutch element 86 is provided with counterpart external teeth 88 adapted to fit nicely within the cavity of clutch element 85 with its clutch teeth 88 interlocking with the internal clutch teeth 87. When said clutch elements 85 and 86 are so interlocked conditions are established for a direct drive between the main power member thru the spline shaft and propeller shaft to the differential at the rear axle, the other transmission elements within the gear box remaining ineffective.

In order to adjust the transmission train to the intermediate speed ratio, gear 79, which is in constant mesh with countershaft gear 81, must be positively coupled to spline shaft 72 in order that the drive may be transmitted thru gears 77, 78, 81 and 79 to said spline shaft. The means for coupling gear 79 to the spline shaft comprise a dished or concave positive dog or toothed clutch element 89 rigid with said gear 79, and said positive dog or toothed element 86 slidable on the spline shaft. Said clutch element 86 is double ended, as shown, and is provided with external gear-like teeth 90 adapted to intermesh with internal teeth 91 formed within the cavity of the clutch element 89 on gear 79.

Double ended sliding clutch element 86 has a circumferential groove 92 about its middle in which yoke 60 engages in order that the clutch element 85 or 89 may interlock with said element 86 at the will of the operator. The teeth 88 and 90 are not continuous around clutch element 86 but are arranged symmetrically in a plurality of segmental batteries or groups separated by grooves or spaces 94 for a purpose presently to be revealed. These groups or batteries of teeth are three in number in the illustrated embodiment. The clutch teeth 87, 88, 90 and 91 are preferably relatively fine and numerous, and their leading ends are double inclined or tapered as at 93 to provide for intermeshing with as little clashing as possible. The tapered surfaces 93 of the teeth at the sides of spaces 94 which merge into correspondingly tapered surfaces 93' on the sides of said spaces also function as detent surfaces in a manner to be explained presently.

It is difficult, especially for inexperienced or careless motor vehicle operators, to change from high to intermediate speed ratio or the reverse, by releasing one pair of toothed positive coupling elements and directly interengaging another without serious clashing, rapid wear and breakage of the teeth ends. The said difficulty has been fully recognized in the past; many remedies have been proposed to overcome it. The most common remedial proposal contemplates bringing the two transmission members to be coupled to approximately uniform speed by a frictional connection effected prior to intermeshing toothed coupling elements. In order to intermesh the toothed elements satisfactorily after uniform speeds have been secured by the friction coupling it is important that the friction coupling be released prior to intermeshing; it is also important to apply sufficient pressure to the friction elements to assure synchronous speeds in the brief period available before intermeshing. I have heretofore created automobile transmission synchronized by friction clutch elements possessing the two important characteristics named, and I have insured synchronous speeds before intermeshing the toothed elements by interposing a releasable connection between the movable toothed element or a part moving with it and the movable friction element or a part moving with it, said releasable connection embodying means requiring a precalculated quantity of force to release it which is sufficient to press the friction elements together in the time permitted forcibly enough to bring the toothed elements to equal speeds before allowing them to intermesh. In this application I also disclose positive and friction clutch elements having a releasable connection between them such that meshing of the positive clutch element with its companion is resisted until synchronization has been accomplished. But instead of interposing a connection calculated to release under a definite quantity of force, I have interposed a detent pair which is set in position to oppose intermeshing in response to a differential rotation, great or small, of the members to be coupled and is displaceable when the setting force developed by the differential rotation has disappeared. The detaining or resisting force is, therefore, in proportion to the inertia of the parts involved.

Referring now to the friction clutch elements by means of which equal rotative speeds of the two power transmitting members to be coupled are attained:

Rigid with the main clutch shaft 71 and exteriorly of the clutch element 85 is a convex conical friction clutch surface 95. A similar convex conical clutch surface 96 is formed on the clutch element 89 rigid with intermediate gear 79. Friction clutch element 97, here designated a friction clutch drum, is provided with an internal conical friction surface 98 adapted to be engaged frictionally with the conical surface 95 on the main clutch shaft 71; an identical clutch drum is adapted to be engaged frictionally with the conical surface 96 on gear 79. As these friction clutch drums are identical in structure and function the same reference characters are used to identify each and its parts.

Each clutch drum 97 may have a bronze clutch shoe on which the internal conical surface 98 is formed. The drum may be pressed from sheet steel in dished form with a flat bottom 99 the central portion of which is removed to form a central hole so that the drum may engage over and surround the spline shaft. The dished portion enters within the cavity of the cooperating composite friction and positive clutch member with internal teeth as shown in Fig. 1. One or more radial lugs 100 extend inward from the periphery of the central hole and enter into one or more of the grooves between the lands of the spline shaft. Lugs 100 are of less circumferential extent than said grooves and provide for a positive driving connection between the spline shaft and the clutch drum and also for a limited relative rotary or angular movement. I have shown three of these lugs 100 for each drum, but there may be one for each groove or any lesser number adequate to afford the necessary strength. The central flat portion surrounding the central hole is preferably a continuous ring connected to the outer zone or rim of the drum by radial spoke-like arms 101, which slant from the central ring to the end outer portions 102 which are flush with the back surface of the outer zone of the drum. The drum illustrated has three such arms equally spaced corresponding to the spaces between the groups or batteries of teeth in the toothed coupling element 86. Because of the described construction of the drum the batteries of teeth 88 or 90 may pass between the arms 101 to engage the companion teeth of the mating clutch element on the other power transmission member when synchronous speeds of the two members have been attained.

Each clutch drum 97 may have a limited axial movement sufficient to permit the conical friction surfaces to be pressed into driving engagement and be released. This movement is preferably very slight as it is desirable to have the internal conical friction surface of the drum ride on the oily external cooperating conical surface of the mating element when clutch element 86 is in neutral for a reason that will presently appear. A stop ring 103 limits the retreat of each drum from interengaging position so that the conical surfaces separate only far enough to allow them to ride one on the other with an oil film in between.

The edges of the portions 102 of arms 101 are provided with inclined detent surfaces 104; or it may be said that the lateral walls of the spaces between the arms have inclined detent surfaces 104. These detent surfaces are preferably substantially parallel, when in contact, with the inclined end faces 93, 93' of the adjacent teeth 88 or 90 and side walls of the spaces 94 of clutch element 86 which constitute coacting detent elements, the intention being that the coacting detent surfaces shall have such form that if forced axially into contact the force acting axially will be resolved into two forces one of which is tangential to the circle in which the detents revolve. The extent of rotary movement relative to the spline shaft of which each drum 97 is capable is sufficient to bring said coacting detent surfaces into axial alinement when the drum is at one or the other extremity of its said relative rotary movement. As long as there is any differential rotation between the spline shaft 72 and the main clutch shaft 71 or between said spline shaft and the gear 79, the drums 97, because they are always in frictional contact respectively with shaft 71 or gear 79 by reason of the oil film between the mating conical surfaces, will be dragged to one extremity or the other of their possible rotary movement on the spline shaft, so that under such conditions an axial thrust upon the clutch element 86 will press the friction surface of one or the other drum into firm contact with its companion friction surface.

If with gears in neutral, main clutch released and car coasting so that spline shaft 72 is being driven by the car moving by inertia, it is desired to connect the spline shaft directly with the intermediate gear 79, which is now idling, together with the counter shaft gears and main clutch shaft 71, the handle of hand lever 55 is moved by the operator to the right and then to the front according to usual practice in American built motor cars. The described movement of the hand lever applies an axial force, greater than that applied in shifting gears directly into mesh as shown herein with respect to changing to low or reverse. The resulting rearward axial movement of toothed coupling 86 forces the inclined detent surfaces 93 on the teeth adjoining one side or the other of each space 94 of the toothed coupling axially against the corresponding detent surfaces 104 of the friction clutch drum 97 on one side or the other of the arms 101, according to whether the gear 79 or the spline shaft 72 is rotating the faster. The force applied to oppose further advance of the toothed coupling toward intermeshing position will then depend upon the tangential force due to the inertia of gear 79, countershaft gears and main clutch shaft 71. If this force is greater than the operator can overcome he cannot intermesh the toothed clutch elements. The pressure he applies in endeavoring to overcome said tangential force presses the friction elements together; when the pressure is sufficient to bring the gear 79 and spline shaft substantially to equal speeds the tangential force disappears and continued pressure upon the hand lever can then displace circumferentially the gear 79 and its dependent elements owing to the inclination of the detent surfaces, permitting the teeth of the positive clutch elements to slide together. Moving the upper end of the hand lever rearward operates in the same manner to synchronize and couple in direct drive.

In Fig. 1 there is shown between each stop ring 103 and drum 97, an annular spring 105 designed to exert an elastic force upon the drum which tends to press the internal conical friction face 98 thereof onto the external conical friction face of its companion member. The force exerted by the spring need not be greater than one or two pounds. The function of the spring is to obtain such contact between the friction surfaces as will insure dragging of the drum to the limit of its angular movement on the spline shaft in one sense or the other dependent upon the relative speeds of the spline shaft and the member to be coupled with it so as to set the detent surfaces in axial alinement. Ordinarily the drag of the oil film between the friction surfaces is adequate for this purpose without axial pressure, but the use of a spring as described assures the desired result.

Spring 105, as illustrated in Fig. 9 may be a ring of material such as steel having a plurality of elastic tongues 106 partially severed from the ring in a circumferential direction and pressed outward from the plane of the ring as shown. As an alternative means for securing a drag between the friction surfaces adequate to set the detent bevels in axial alinement a spring may be mounted on the drum in the path of movement of the coupling element 86 as it moves toward intermeshing position, and be so disposed that said coupling may contact with the spring during the initial portion of said movement, apply through it a relatively light pressure sufficient to obtain a degree of frictional engagement between the coacting conical surfaces of the frictional elements that is adequate to insure alinement of the detent bevels, and then deform the spring and pass by it. In Figs. 7 and 8 a convenient form and mounting of a spring for the desired purpose is illustrated. A straight spring steel wire 107 is inserted through alined holes drilled through the drum 97 at the positions 108. Notches 109 may be cut or formed in the drum to receive the ends of the wire, and these ends may be bent as at 110 to hold the wire in place. The spaces between spokes or arms 101 of the drums may be formed with a rectangular enlargement 111 across which the wire extends along a chord of the drum circle. The middle of the wire 107 is disposed a distance from the axis of the spline shaft somewhat less than the tooth crown radius of coupling 86, the teeth of which are rounded or beveled as at 112 so that these leading beveled ends may touch the wire during the initial portion of the intermeshing movement of the coupling, spring the wire to one side and pass on. There may be as many wires as there are spaces between arms.

In accordance with the statutes I have illustrated and described my invention in the best forms now known to me; but I do not intend to be limited to the specific details of construction of the disclosure but only by the scope of the appended claims.

I claim:

1. The combination of two coaxial power transmitting members one of which includes a grooved shaft; a toothed positive clutch element keyed to and slidable on said grooved shaft; a toothed positive clutch element fixed to the other power transmitting member; mating friction clutch elements respectively connected to be positively driven by the respective power transmitting members; one of said friction clutch elements provided with radial lugs engaging in the grooves of the grooved shaft so as to be capable of limited relative rotary motion thereof with respect to said shaft; said last named friction clutch element having passages adapted to permit the teeth of the slidable positive clutch element to pass therethrough and engage the companion toothed clutch element; inclined detent surfaces at the edges of the passages thru said friction clutch element and cooperating inclined detent surfaces on the slidable positive clutch element which are in alinement when the friction element is at either limit of its relative rotary movement.

2. A combination as defined in claim 1 wherein said friction clutch elements have coacting conical friction clutch surfaces one of which is freely rotatable on the other when they are in non-driving position and means for limiting the releasing movement of the friction clutch elements.

3. A combination as defined in claim 1 wherein said friction clutch elements have coacting conical friction clutch surfaces one of which is freely rotatable on the other in non-driving position, and a stop on the grooved shaft to limit axial releasing movement of the friction clutch element which is driven positively by said shaft.

4. A combination as defined in claim 1 wherein the friction clutch element driven by the groved shaft comprises a centrally perforated ring-like part surrounding the grooved shaft and arms radiating from the central ring-like part toward the frictional engaging surface leaving openings between the arms thru which the teeth of the slidable positive clutch element may pass.

5. The combination of two coaxial power transmitting members, one of which includes a splined shaft; a friction and a positive clutch element independently keyed to and movable axially of the spline shaft and positively driven thereby, said friction clutch element having means engaging between the splines to permit a limited rotary movement with respect to said spline shaft; a friction and positive clutch element fixed to the other power transmitting member; means for moving said slidable positive clutch element toward its companion member, cooperating detent surfaces on said axially movable friction and positive clutch elements adapted to be brought into engagement by the axial movement of the positive clutch element toward its mating element whereby the friction clutch elements are pressed into engagement and the toothed clutch elements are prevented from engagement until the axial pressure exerted between the detent surfaces angularly displaces the axially movable friction clutch element relative to the axially movable toothed clutch element.

6. A combination as defined in claim 5 in which the axially movable friction clutch element comprises a dished drum having a ring-like central part surrounding the spline shaft, and radiating arms inclined from the ring-like part toward the slidable toothed clutch element, providing spaces therebetween; the fixed clutch element comprising internal radiating teeth, and the sliding clutch element external radiating teeth arranged in equally spaced groups, the groups being separated by inclined grooves of greater depth than the teeth, said inclined grooves and inclined radiating arms corresponding in number and width.

7. The combination of two coaxial power transmitting members adapted to be positively coupled in driving relation, each comprising a toothed coupling element, one of which is axially movable into and out of mesh with the other, and a friction element, one of which has a lost motion connection with the member by which it is driven and an axial movement to engage its companion; coacting detents on the approaching sides of said last named friction element and the toothed element driven by the same transmission member, said detents arranged to be in alinement when said lost motion driven friction element is at one end of its angular movement and constituting the only means whereby the friction element may respond to an axial movement of the toothed element, and a spring tending to press the friction surfaces of said friction elements together.

8. A combination as defined in claim 7 with the addition of a stop ring on the power transmission member that has a lost motion driving connection with a friction element and said spring surrounding said last named power transmission member between the stop ring and the friction element.

9. The combination of two coaxial power transmitting members adapted to be positively coupled in driving relation, a friction and a positive coupling element driven by one member, separate friction and positive elements driven by the other member and axially movable to effect friction and positive coupling of said members in sequence; said last named friction element having openings therethru and separate deflectable spring wires disposed across said openings along chords of a circle struck from the center of said friction element, and said last named positive coupling element having a plurality of teeth adapted to deflect said spring wires and to pass thru said openings in order to first effect engagement of the friction coupling and thereafter engagement of the positive coupling.

10. A combination as defined in claim 9 in which the openings thru the friction element are separated by radial spoke-like formations; the separate deflectable spring wires are stretched across within said openings, and the axially movable positive coupling provided with groups of teeth, said groups being equal in number to said openings in the friction element and separated by spaces adapted to receive the spoke-like formations.

11. A combination as defined in claim 9 wherein the axially movable friction coupling element has a lost motion driving connection with the member by which it is driven, and detents on the axially movable positive and friction coupling disposed in alinement when the friction coupling is at one end of its path of angular movement with respect to the member by which it is driven.

12. The combination of two coaxial power transmitting members one of which includes a grooved shaft; a toothed positive clutch element slidable but not rotatable on said shaft; a toothed positive clutch element fixed to the other power transmitting member; two friction clutch elements respectively connected to be positively driven by the respective power transmitting members, one of said friction clutch elements having radial lugs engaging in the grooves of the grooved shaft so as to be capable of limited relative rotary and axial movement with respect to said grooved shaft; said last named friction clutch element having passages adapted to permit the teeth of the slidable positive clutch element to pass therethrough and engage the teeth of the companion positive clutch element; cooperating detent surfaces at the edges of the passages through said last named friction clutch element, and on the slidable positive clutch element, said detent surfaces being disposed in alinement when the friction clutch element is at either limit of its rotary movement relative to the shaft.

EARL A. THOMPSON.